United States Patent [19]
Corso et al.

[11] Patent Number: 4,893,519
[45] Date of Patent: Jan. 16, 1990

[54] HANDLEBAR GRIP

[75] Inventors: Riccardo Corso; Roberto Maccioni; Giuliano Passaglia, all of Viareggio, Italy

[73] Assignee: Sandro Mentasti & C. S.a.S., Varese, Italy

[21] Appl. No.: 230,905

[22] Filed: Aug. 11, 1988

[51] Int. Cl.[4] .............................................. B62K 21/26
[52] U.S. Cl. ...................................... 74/551.9; 74/558.5
[58] Field of Search ................ 74/551.9, 551.8, 558.5, 74/558, 551.1; 273/75, 81 R

[56] References Cited

U.S. PATENT DOCUMENTS

| | | | |
|---|---|---|---|
| 168,109 | 8/1821 | Brook | 74/551.9 |
| 1,749,207 | 3/1930 | Blair | 273/75 X |
| 2,091,458 | 8/1937 | Sleight | 74/551.9 |
| 3,368,811 | 2/1968 | Finney | 74/551.9 |
| 3,530,739 | 9/1970 | Meier | 74/558 |
| 4,416,166 | 11/1983 | Jannard | 74/551.9 |

FOREIGN PATENT DOCUMENTS 2805314 of 1979 Fed. Rep. of Germany ........ 273/75

Primary Examiner—Gary L. Smith
Assistant Examiner—Flemming Saether
Attorney, Agent, or Firm—Frost & Jacobs

[57] ABSTRACT

A handlebar grip, particularly for a cross-country motorbike, has a covering of densely distributed flexible needles extending in a substantially radial direction from the external cylindrical surface of a tubular handgrip body mounted on the extremity of the handlebar. The needles made of a material with a high modulus of elasticity provide a grasp surface desirably soft and capable of ensuring a secure grasp also in presence of rain and mud by "pricking" the palm side of a preferably gloved rider's hand. The needles have the points preferably oriented in such a way as to form a favorable incidence angle with the rider's hand for promoting a more secure grasp.

7 Claims, 1 Drawing Sheet

HANDLEBAR GRIP

BACKGROUND OF THE INVENTION

1. Field of the Invention

The present invention relates to a handgrip particularly suitable for motorbikes' handlebars and more particularly for cross-country type motorbikes.

2. Description of the prior art

Various types of handgrip, especially handlebar grips, are commercially available. These handlebar grips are generally formed by a cylinder of soft material, commonly rubber, closed at one end and having a hand confining flange at the other end. The external grip surface has commonly a more or less rough contour which varies from model to model and is obtained for example by means of a plurality of radially extending beads or by means of longitudinal ribs and/or grooves or by other expedients, in order to favor a secure grasp of the rider's generally gloved hands during cross-country riding.

Because of strong vibrations of the handlebar, a good grasp is often difficult to maintain beyond certain limits and moreover it often becomes more and more difficult in presence of rain and mud which may render slippery the handgrip making haphazard for the gloved hand to find a strong hold on the surface of a mud smeared handgrip. On the other hand the rider's hand cannot be "engaged" with the handgrip itself but must preserve entirely the ability to rotate and detach without any impediment to meet any need. This calls-off the use of any "fastening" means between the handgrip surface and the gloved hand.

It is evident the importance for the rider's safety to ensure a secure grasp between the gloved hand and the handgrip under any circumstance, what is not always possible to achieve with known handgrips.

SUMMARY OF THE INVENTION

A main objective of the present invention is to provide a handlebar grip especially for cross-country motorbikes, said grip having an improved adherence characteristic which is not subject to degradation because of rain and/or mud which may soil the handgrip, for instance during a competition.

The handlebar grip object of the present invention characterizes itself by having an external covering comprising a plurality of densely distributed needles which extend from the external cylindrical surface of a tubular body covering an extremity of a handlebar. The needles are made with a material having a relatively high coefficient (modulus) of elasticity, sufficient to produce needles flexible during use, such as for example: stainless steel, polyamidic resins, polyolefinic resins, carbon fibers, polyaramidic fibers (e.g. Kevlar, a trade name of E.I. Du Pont de Nemours), etc.. The needles provide a secure grasp by "pricking" the fabric or the leather of the rider's glove also in presence of mud or rain.

Preferably, the length of the needles is comprised between 2 and 10 millimeters for a needles' diameter comprised preferably between 0.3 and 1 millimeters. Generally the greater is the diameter of the needles used the longer these are made in order to maintain a diameter to length ratio such as to ensure a certain flexibility of the needles, i.e. in order to provide for a "soft" feel of the handgrip. Relatively thin and long needles are too flexible and relatively thick and short needles are too rigid. Also the choice of the density of the needles over the cylindrical surface of the handgrip is tied to the desirability of obtaining a certain flexibility (softness) or deformability degree) of the handgrip. Preferably the density of the needles is comprised between 4 and 15 needles per square centimeter.

The needles may all have the same length (height), but is also possible to arrange two orders of intermingled needles wherein the needles belonging to a first order have a certain length while the needles belonging to the second order have a length greater than the length of the first order's needles by about 1–2 millimeters. This embodiment is particularly suitable to favor the achievement of a desired softness of the handgrip especially when the needles used are relatively little flexible or relatively dense.

The needles of the external covering of the handgrip may be directly fastened to a tubular body of the grip, customarily provided with an abutment flange portion to confine the hand of the rider, suitable to be pushed over the extremity of a handlebar and to be fixedly retained thereon either by a forced engagement or by a suitable stop means. The tubular body of the handgrip onto which are fastened the needles of the external covering may be a composite comprising an external superficial layer made for example of a rubberized fabric, to which are fastened the needles, combined with a supporting central tubular core which may be of rubber, of a formable thermo-plastic material or of metal and which are permanently joined together to form a one piece handgrip.

Alternatively the needles of the external covering of the handgrip may be fastened to a tubular sheath of a rubberized fabric for instance, which may be removably pulled over a cylindrical tubolar body of the grip, which may be permanently fixed over the handlebar extremity. This alternative embodiment is useful in allowing an interchangeability of external needle coverings of different characteristics, as well as for replacing accidentally damaged needle coverings.

The needles may extend in a truly perpendicular direction with respect to the cylindrical surface of the handgrip tubolar body or of the sheath applied thereon. Alternatively the needles may be inclined in respect to a generatrix line of said cylindrical surface, preferably toward the center of the handlebar, in order to provide a most efficient incidence angle between the points of the needles and the glove's palm. Especially for the throttle control handgrip of a motorbike, it is useful to incline the needles in respect to the circumference of the cylindrical surface of the handgrip in a clock wise direction (for a right hand side handlebar grip observed from the right hand side) in order to provide a more efficient incidence angle between the points of the needles and the rider's glove to prevent slippages during the torsion of the throttle grip.

Of course the same results may also be obtained by utilizing needles fastened substantially perpendicularly to the external cylindrical surface of the handgrip body, but having their terminal portion or point bent in a desired direction.

BRIEF DESCRIPTION OF THE DRAWINGS

Exclusively for illustrative and non-limitative purposes, the invention will be further described in detail with reference to a preferred embodiment thereof depicted in the annexed drawings, wherein.

DESCRIPTION OF THE PREFERRED EMBODIMENT

Figure 1:
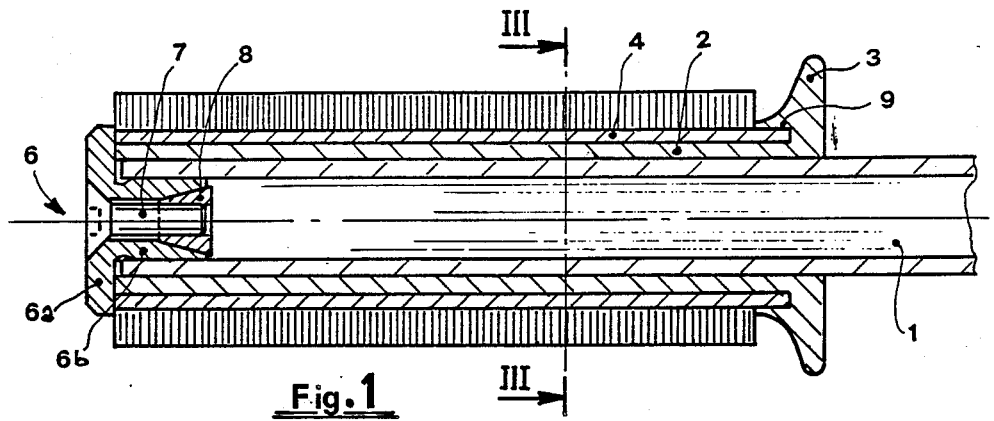
FIG. 1 is a longitudinal sectional view of a handgrip of the invention.
Figure 2:
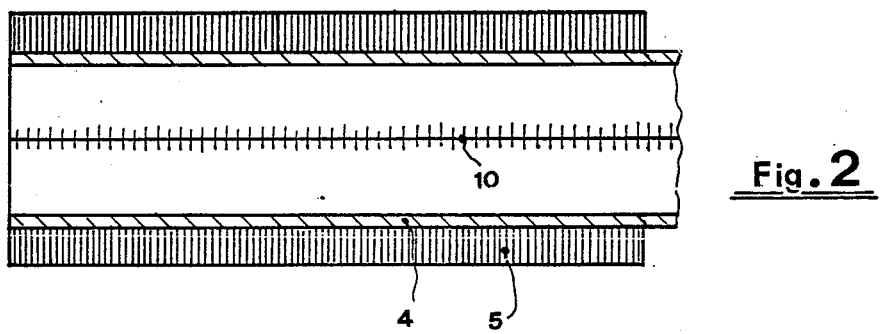
FIG. 2 is a longitudinal sectional view of an external covering of a handgrip made in accordance with the present invention.
Figure 3:
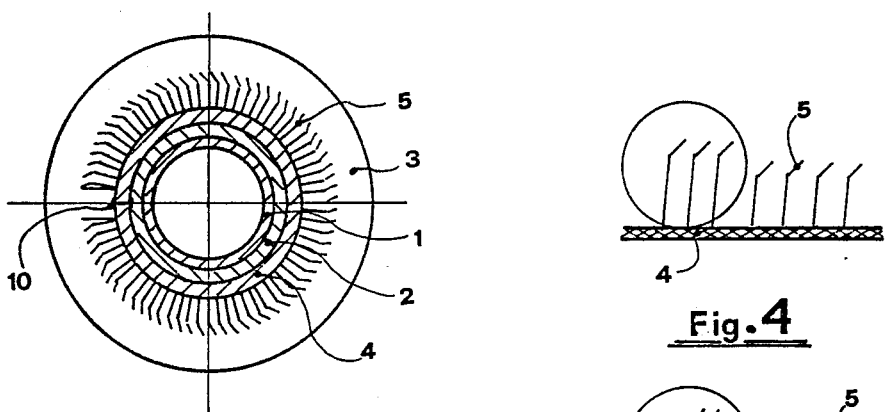
FIG. 3 is a cross section view of the handgrip of FIG. 1 wherein the section plane is indicated by the arrows III—III.

With reference to FIGS. 1, 2 and 3, over the end of a motorbike's handlebar 1 is placed a cylindrical tubular handgrip body 2, forcibly pushed over the free end of the handlebar and having a flange portion 3 for "confining" the rider's hand. The tubular body 2 and the relative flange 3 may be made with a commonly used material, such as plastic, resin or rubber, metal and the like. Over the tubular handgrip body 2 there is a tubular sheath 4, e.g. a preferably rubberized woven or unwoven fabric, from the external cylindrical surface of which a plurality of flexible needles 5 extend substantially in a radial direction. The needles have a relatively sharp point and are preferably of stainless steel although they may also be of another material having a sufficiently high modulus of elasticity, as mentioned before. The needles 5 are densely distributed in a substantially uniform manner over the entire cylindrical surface of the sheath 4 serving as support and fastening means for the needles.

For fastening the needle covering, formed by the supporting tubular sheath 4 and by the needles 5, on the handlebar extremity 1 or, more precisely as in the embodiment shown, on the tubular handgrip body 2, a stopper 6, applied to the extremity of the handlebar, is contemplated. In particular, the stopper 6 has a head or plug 6a and a hollow stem 6b suitable to engage inside the extremity of the handlebar 1, as well as an expansive screw anchor 7 comprising a truncated cone element 8. By tightening the screw 7, the truncated cone element 8 expands the hollow stem 6b, pressing it against the internal wall of the handlebar end 1, thus retaining in place the handgrip assembly by means of the external had or plug 6a.

Preferably the flange 3 is provided with an annular groove 9 capable of accomodating the end of the tubular sheath 4 supporting the plurality of needles 5.

The sheath or tubular support of the covering of the handgrip, preferably made with rubberized cloth more or less flexible and extendible, may be butt joined at 10 in order to obtain a cylindrical shape, as shown in FIG. 2.

Alternatively a tape of rubberized cloth with needles set therein may be wound around a handgrip tubular body and securely fixed at its extremities.

As shown in FIG. 3 a handgrip particularly, although non-exclusively, suitable for throttle grisp (twist grip), has the extremities of the needles of the covering 5 inclined in such a way as to obtain the points of the needles oriented in a anti-clock wise direction in respect to the section plane observation indicated by the arrows III—III in FIG. 1.

Figure 4:
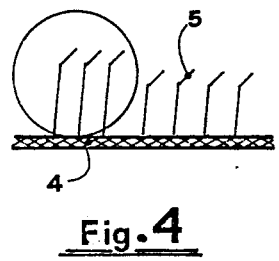
FIGS. 4 and 5 are enlarged partial views showing two alternative configurations of the needles of the external covering of the handgrip of the invention according to different embodiments thereof.
Figure 5:
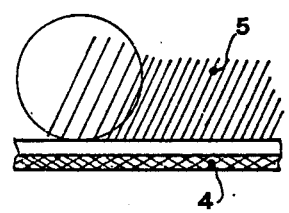

The needles of the covering, are shown in greater detail in the enlarged partial view of FIGS. 4 and 5, which illustrate two alternative embodiments wherein the needles of the covering have their points bent along an inclined direction in respect to a generatrix line of the cylindrical surface of the grip, as shown in FIG. 4; or wherein the needles are fastened to the cylindrical surface of the support sheath in a way as to be inclined in respect to a generatrix line of the cylindrical surface, as shown in the embodiment depicted in FIG. 5.

The needle covering of the handgrip of the present invention may be made by utilizing a readily available material such as a rubberized cloth carrying a plurality of needles densely distributed and fixedly set thereon, in a form as commonly utilized in textile processes for carding fibers.

Usually these materials employ "U" shaped wires set through the fabric so as to be permanently and securely held therethrough; the two "legs" constituting two needles emerging from the front surface of the cloth. Obviously any other method for permanently setting the needles on a cylindrical support may be used.

Retrofitting of existing handgrips with the external needle covering according to the present invention to provide for a secure grasp is considered to fall within the scope of the present invention.

I claim:

1. A handgrip for a handlebar comprising a tubular body covering an extremity of the handlebar, wherein said tubular handgrip body has a covering formed by a plurality of densely distributed flexible needles extending from an external cylindrical surface of said body, wherein said needles are made of a material belonging to the group composed of stainless steel, polyamides polyolefins and carbon fibers, and having a modulus of elasticity sufficiently high to produce flexible needles, said needles having a length comprised between 2 and 10 millimeters.

2. The handgrip according to claim 1, wherein said needles extend in a perpendicular direction from said cylindrical surface.

3. The handgrip according to claim 2, wherein said needles have a terminal portion bent in an inclined direction in respect to said cylindrical surface.

4. The handgrip according to claim 1, wherein said needles extend along an inclined direction from said cylindrical surface.

5. The handgrip according to claim 1, wherein said covering is formed by a supporting tubular sheath, from the external cylindrical surface of which said needles extend, and the tubular sheath is removably placed over a tubular handgrip body disposed over the extremity of the handlebar.

6. The handgrip according to claim 5, wherein said tubular handgrip body is provided with a rider's hand confining flange having a circular groove into which the end portion of said tubular sheath supporting the plurality of needles fits.

7. The handgrip according to claim 1, 2, 3, 4, 5 or 6, including a stopper means which comprises a round plug having a hollow stem fitting inside a tubular end of the handlebar and provided with an expandable conical element capable of expanding said hollow stem to press against the internal wall of said tubular end of the handlebar.

* * * * *